United States Patent [19]
Johnson

[11] 3,920,871
[45] Nov. 18, 1975

[54] WOVEN STRUCTURAL ELEMENT, METHOD OF MANUFACTURE THEREOF, AND METHOD OF MAKING A BOAT HULL THEREFROM

[75] Inventor: Frederick M. Johnson, Austin, Tex.

[73] Assignee: Insulex, Austin, Tex.

[22] Filed: Sept. 23, 1974

[21] Appl. No.: 508,690

[52] U.S. Cl. .................. 428/54; 52/309; 52/578; 156/148; 428/55; 119
[51] Int. Cl. ............................................. B32b 3/16
[58] Field of Search .......... 161/36, 38, 159; 52/578, 52/579, 309; 156/148, 242

[56] References Cited
UNITED STATES PATENTS

| | | | |
|---|---|---|---|
| 2,315,837 | 4/1943 | Brown et al. ...................... | 161/36 |
| 3,560,316 | 2/1971 | Gill ...................................... | 161/41 |
| 3,573,144 | 3/1971 | Anderson............................ | 161/38 |
| 3,668,051 | 6/1972 | Seemann............................ | 161/78 |

*Primary Examiner*—William E. Schulz
*Attorney, Agent, or Firm*—Tom Arnold

[57] ABSTRACT

A structural element having a high strength to weight ratio comprising parallel rows of alternately, oppositely undulated bundles of substantially untwisted fiberglass rovings and a series of parallel foamed plastic slats extending transversely thereof and alternately under and over adjacent bundles so as to define a woven structural element of foamed plastic slats and bundles of fiberglass rovings. The weave of the woven structural element allows such element to take the form of a curved surface. Settable resin impregnation of the woven structure provides I-beams of settable resin between foamed plastic slats, with the weave of the bundles of fiberglass rovings and foamed plastic slats providing X-reinforcement of glass rovings in the I-beams of settable resin.

The structural element is manufactured by weaving on a weaving machine parallel rows of bundles of substantially untwisted fiberglass rovings and a series of parallel foamed plastic slats, while maintaining the looseness of the weave so that the structural element can take the form of a curved surface. A final structural element is formed by forming the woven structure into any desired form, impregnating the woven structure with a settable resin, and setting the settable resin so that the structural element maintains the desired form.

A boat hull can be formed using the structural element described above utilizing a mold by a method which comprising laying up on the mold a first face sheet of settable resin impregnated fiberglass matting or woven fiberglass cloth, placing on such first face sheet a central buoyancy element comprising the above described structural element, impregnating the central buoyancy element with a settable resin, laying up on such central buoyancy element a second face sheet of settable resin impregnated fiberglass matting or woven fiberglass cloth and setting the settable resins.

The structural element has the advantages of a high strength to weight ratio and ease of manufacture. Additional strength is provided by the X-reinforcement of fiberglass rovings in the I-beams of resin.

25 Claims, 6 Drawing Figures

WOVEN STRUCTURAL ELEMENT, METHOD OF MANUFACTURE THEREOF, AND METHOD OF MAKING A BOAT HULL THEREFROM

BACKGROUND OF THE INVENTION

1. Field of the Invention

This invention relates to a structural element having a high strength to weight ratio, a method of manufacturing such structural element, and a method of manufacturing a boat hull utilizing such structural element. More particularly, the present invention is directed to a woven structural element of fiberglass rovings and foamed plastic slats, the structure being impregnated with a settable resin, a method of weaving such structural element so as to provide an element which can conform to a curved surface, and a method of forming a boat hull using a mold in which the structural element of the present invention constitutes a central buoyancy element between facing sheets of settable resin impregnated fiberglass matting or woven fiberglass sheets.

2. Description of the Prior Art

Structural elements prepared from resin impregnated glass fibers, with or without plastic foam inserts have been proposed for many years due to the generally high strength to weight ratio which is achieved. Two such proposals are found, for example, in U.S. Pat. No. 3,560,316 to Gill and U.S. Pat. No. 3,573,144 to Anderson.

For example, the Gill patent is directed to an integrally formed laminated fiberglass flooring material which has a continuous top skin and I-beam stress elements. This integrally formed laminated fiberglass flooring material is formed by molding a resin impregnated glass cloth around a plurality of foam mandrels and then cutting away the bottom surface of each core element and removing the mandrel therefrom. Accordingly, the flooring material which results is one which has a continuous top sheet with no continuous bottom sheet, but with I-beam elements extending from and integrally formed with the top sheet of resin impregnated fiberglass. The method of production in Gill and the final product of Gill have certain disadvantages. For example, the method of manufacture is quite cumbersome in that each foam mandrel must be individually wrapped with a resin impregnated fiberglass cloth prior to assembly of the individual mandrels and subsequent setting of the resin. Moreover, due to the wrapping which is carried out in accordance with Gill, the product of Gill does not possess any substantial degree of moldability which would allow the structural element to take the form of a curved or contoured curved surface, but, rather, the structure of Gill has limited utility, such as, for example, as a flooring material in the aircraft industry. The decrease in weight which is achieved by Gill by removal of the foam mandrels is accompanied by a decrease in strength which tends to limit the practical utility laminated the laminted fiberglass flooring material of Gill.

Some of the disadvantages in the method and product of Gill are eliminated in the sandwich panel type structural element of the Andersen patent, wherein the core of the structural element is formed by intraweaving resin impregnated glass cloth webs and rigid spacer blocks. This structure of Andersen also provides an element of high strength to weight ratio, but, like the structural element of Gill, is of limited utility, its principal utility being as a floor panel, etc., for the aircraft industry. This is primarily due to the fact that in preparing the sandwich panel type structural element of Andersen, care must be taken to press the spacer blocks together prior to any setting of the resin, thereby producing a structural element which cannot readily adapt to curved or contoured curved surfaces. Moreover, due to the large size of the rigid spacer blocks employed by Andersen, and due to the fact that the weaving is carried out with a resin impreganted glass cloth web and the rigid spacer blocks, such weaving must be carried out by hand, making the method of production uneconomical and unattractive.

The use of foam slats or inserts and resin impregnated fiberglass has not been limited to the types of flooring materials capable of being formulated from the structural elements such as represented by the Gill and Andersen patents. For example, it has been previously proposed that boat hulls can be advantageously prepared from resin impregnated fiberglass and foam inserts. Representative examples of this type of construction are illustrated in U.S. Pat. No. 3,668,051 to Seemann and U.S. Pat. No. 3,687,768 to Vaitses.

The Seemann patent above describes a method of constructing boat hulls using fiberglass, wherein a surface defining base material of a pliable sheeting, for example, a loosely woven fabric or elastic mesh reinforced with springy rods is attached to a skeleton framework which readily and easily assumes and forms the compound-curved surface of the boat hull, with subsequent addition of a resin and hardening of the resin. The disadvantages of this type of boat hull construction are many. Foremost, however, are the disadvantage of the necessary employment of a skeleton framework and the complicated multi-step or stage procedure necessary to apply the various layers which eventually make up the compound-curved structure of the boat hull. Accordingly, a method such as described in the Seeman patent is not practical from the standpoint of providing a low-cost yet strong fiberglass boat hull.

The Vaitses patent describes an improved method of forming a laminated boat hull using a mold, thereby eliminating the skeleton structure employed in the Seemann patent. The method described in Vaitses comprises the steps of laying up on the mold a first skin, e.g., a settable resin impregnated fiberglass fabric; placing upon the first skin a first set of substantially parallel spaced elongated members, e.g., polyurethane foam members; laying a continuous membrane adhering to the exposed portions of the first skin; placing a second set of substantially parallel spaced elongated members upon the continuous membrane so as to substantially fill the interstitial valleys between the members of the first set; and laying up a second skin, e.g., resin impregnated fiberglass fabric upon the second set of elongated members, and upon the exposed portions of the continuous membrane so as to complete the boat hull.

The method of fabrication in the Vaitses patent suffers from various disadvantages, the major disadvantage of which is the necessity of placing first and second sets of spaced members in a particular relationship to one another and in a particular spaced relationship of the members within each set. This requires time-consuming placement of individual members with the great possibility that structural strength in the boat hull can be lost due to misplacement or misalignment of elements. This, coupled with the fact that the method of construction described in the Vaitses patent requires a great number of steps to be carried out in a particular sequence and time interval makes such method somewhat less than totally satisfactory.

SUMMARY OF THE INVENTION

It is within the foregoing background that the structural element of the present invention, the method of manufacturing such structural element, and a method of forming a boat hull with such structural element were developed. Such structural element in accordance with the present invention broadly comprises parallel rows of alternately oppositely undulated bundles of substantially untwisted fiberglass rovings and a series of parallel foamed plastic slats extending transversely of such rows and alternately under and over adjacent bundles so as to define a woven structural element of foamed plastic slats and bundles of fiberglass rovings. The weave of the woven structural element allows the element to take the form of a curved surface, preferably the compound-curved surface of a boat hull. Impregnation of the structural element with a settable resin and subsequent setting of the resin produces a structural element having a high strength to weight ratio. The resin impregnation of the woveen structure provides for I-beams of resin between the foamed plastic slats with X-reinforcement of glass rovings therein. In utilization of such structural element in the production of a boat hull, the resin impregnated structural element of the present invention is utilized as a central buoyancy element between first and second face sheets of resin impregnated fiberglass matting or woven fiberglass cloth.

Accordingly, it is a principal feature of the present invention to provide a novel structural element and a method of manufacturing such structural element wherein the disadvantages of prior art materials are eliminated and such structural element can readily take the form of a curved surface, providing a great strength to weight ratio.

It is a further feature of the present invention to provide such structural element and method of manufacturing such structural element wherein the element comprises parallel rows of alternately oppositely undulated bundles of substantially untwisted fiberglass rovings and a series of parallel foamed plastic slats extending transversely of such rows and alternately under and over adjacent bundles, the weave of the woven structural element allowing the element to take the form of a curved surface.

It is still a further feature of the present invention to provide such structural element and method of manufacturing such structural element wherein the woven structural element is impregnated with resin, thereby forming I-beams of resin between foamed plastic slats, the woven bundles of fiberglass rovings providing X-reinforcement of glass rovings in the I-beams of resin.

Yet a further feature of the present invention resides in the method of manufacturing such structural element, wherein the structural element is manufactured by weaving on a weaving machine parallel rows of bundles of substantially untwisted fiberglass rovings and a series of parallel foamed plastic slats to produce a woven structure wherein the parallel foamed plastic slats extend transversely of the rows and alternately under and over adjacent bundles, the looseness of the weave being maintained so that the structural element can take the form of a curved surface.

It is still a further feature of the present invention to provide a method of forming a boat hull utilizing a mold wherein the woven structure of the present invention is placed between first and second face sheets of resin impregnated fiberglass matting or woven fiberglass cloth in formation of the fiberglass boat hull.

Still further features and advantages of the structural element, method of manufacturing the structural element, and method of forming a boat hull utilizing such structural element will become more apparent from the following more detailed description of the present invention, particularly in connection with the accompanying drawings.

BRIEF DESCRIPTION OF THE DRAWINGS

In the attached drawings, which represent preferred embodiments of the present invention only.

DESCRIPTION OF PREFERRED EMBODIMENTS

Figure 1:
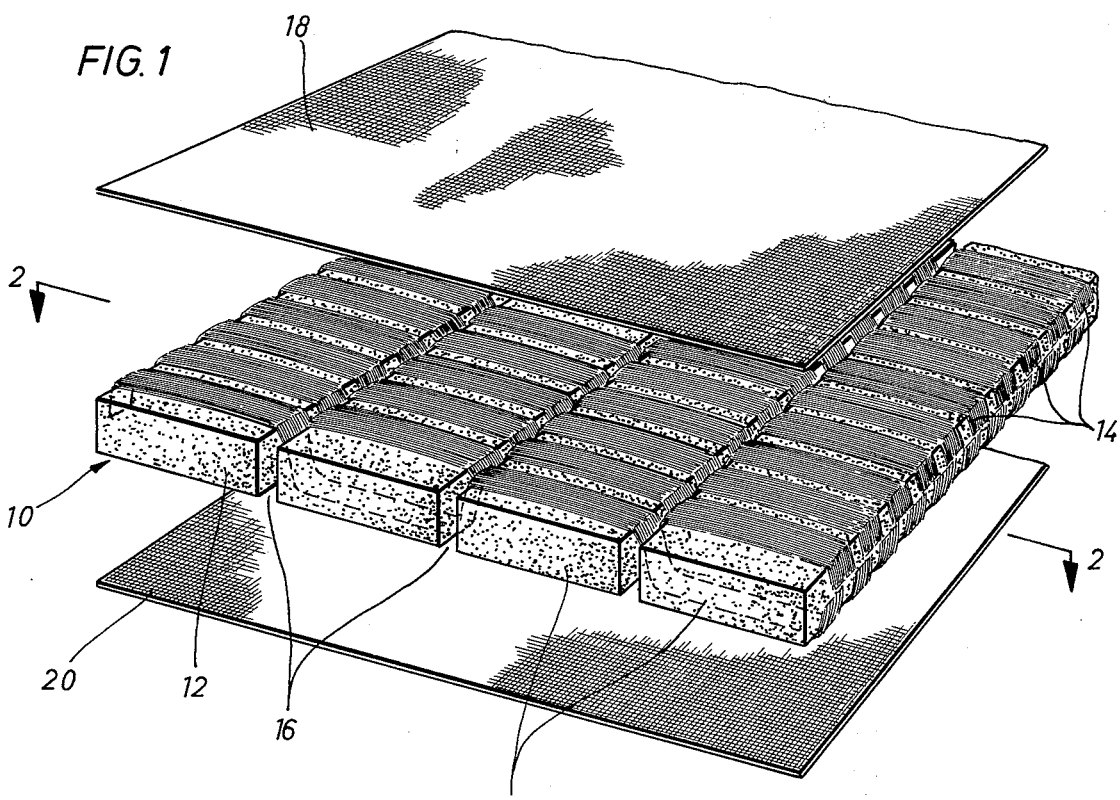
FIG. 1 is an exploded perspective view of the structural element of the present invention illustrating the relationship of the woven structural element and facing sheets.

As shown in the drawings, the novel structural element 10 of the present invention is formed of a plurality of foamed plastic slats 12 and a plurality of bundles of glass fiber rovings 14. As can be readily seen from FIGS. 1 and 2, structural element 10, in accordance with the present invention, comprises parallel rows of alternately oppositely undulated bundles of glass fiber rovings 14 and a series of parallel foamed plastic slats 12 extending transversely of the rows of glass fiber rovings 14 and alternately under and over adjacent bundles, so as to define woven structural element 10 of foamed plastic slats 12 and bundles of glass fiber rovings 14.

Figure 2:
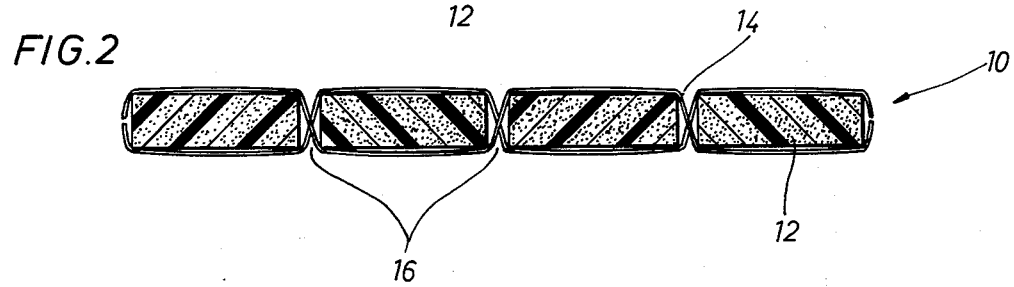
FIG. 2 is a cross-sectional view of the woven structural element of FIG. 1 taken along line 2—2.

As illustrated in the embodiment set forth in FIGS. 1 and 2, the foamed plastic slats 12 and bundles of glass fiber rovings 14 are woven in accordance with the present invention so that a gap or space 16 is present between adjacent foamed plastic slats 12. The looseness of the weave which allows the presence of space 16 allows structural element 10 in accordance with the present invention to take the form of a curved surface, in particular, a contoured curved surface of a boat hull. This is illustrated, for example, in FIG. 5, to be discussed hereinafter.

For the purposes of allowing the structural element of the present invention to be utilized in the fabrication of a fiberglass boat hull, the distance of gap 16 between adjacent foamed plastic slats 12 should be at least one-sixteenth inch, preferably at least one-eighth inch. Such distances will effectively allow structural element 10 in accordance with the present invention to be readily deformed so as to take the form of the contoured curved surface of a boat hull.

The gap 16 between adjacent foamed plastic slats 12 also allows for X-reinforcement by fiberglass rovings 14 between adjacent foamed plastic slats 12. This X-reinforcement is clearly seen in FIG. 2 and FIG. 4.

As illustrated in the embodiment of FIG. 1, structural element 10 of the present invention can be advantageously employed as the middle or central element of a composite laminate, utilizing first and second face sheets, 18 and 20. These face sheets 18 and 20 can be advantageously formed of a woven fiberglass fabric or fiberglass matting. As will be discussed hereinafter in connection with the preparation of a boat hull using the type of laminate illustrated in FIG. 1, face sheets 18 and 20 can be advantageously impregnated with a settable resin, which, upon setting, forms a rigid, strong and lightweight construction element.

In the embodiment illustrated in FIG. 1, face sheets 18 and 20 are illustrated as single sheets of fiberglass matting or a woven fiberglass cloth. However, it is clearly within the scope of the present invention to employ a multiplicity of plies of either a fiberglass matting and/or woven fiberglass cloth as face sheets 18 and 20 in conjunction with structural element 10 in the formation of a composite laminated structural element. In addition, while fiberglass is a preferred material, particularly in the area of boat hull production, it is within the scope of the present invention to employ in lieu of fiberglass matting or woven fabrics prepared from other natural or synthetic organic or inorganic fibrous materials such a hemp, jute, wool, cotton, nylon, polyester, polypropylene, graphite, or metallic fibers, all of which can replace the glass fibers in whole or in part.

In accordance with the present invention, foamed plastic slats 12 can be formed of any cellular plastic or foam, i.e., a plastic material with numerous cells disposed throughout its mass. The cellular plastic slats 12 in accordance with the present invention provide the desirable high strength to weight ratio which is achieved in the structural element 10 of the present invention. Preferably, foamed plastic slats 12 are formed from a urethane foam, a material often referred to as a polyurethane foam or isocyanate foam. These cellular plastics are a part of a class of materials in which the chemical reaction causing foaming occurs simultaneously with the polymer-forming reaction. Generally, in the case of polyurethane resins, the polymeric constituent of the urethane foam is made by reacting a polyol, either a polyether or polyester, with an isocyanate. When the isocyanate is in excess of the amount that will react with the polyol and when water is present, the excess isocyanate will react with water to produce carbon dioxide which expands the mixture. This procedure for the production or urethane foams is well known in the art and will not be further discussed here. In effect, any and all methods of producing urethane foams and any and all typically produced urethane foams can be advantageously utilized in the formation of the foamed plastic slats 12 useful in structural element 10 of the present invention.

While the use of the urethane foam is preferred in accordance with the present invention, foamed plastic slats 12 can be advantageously prepared from other plastic materials. All that is required is that the plastic material utilized in the formation of foamed plastic slats 12 be capable of providing a structural element 10 of a high strength to weight ratio. Other typical materials include, for example, foamed polystyrene, foamed epoxy resins, foamed ABS resins, foamed cellulose acetate resins, foamed phenolic resins, foamed polyethylene and polypropylene resins, as well as other foamed polymers. In addition, while the use of a foamed plastic is greatly preferred in accordance with the present invention, it is possible that for some applications a portion or all of the foamed plastic can be replaced with other lightweight structural elements such as wood, aluminum, etc. These embodiments, therefore, must be considered to be within the scope of the present invention.

Foamed plastic slats 12 are generally formed so as to have a rectangular cross-section. The formation of the foamed plastic slats 12 in this shape can be carried out utilizing conventional molding and foaming equipment well known in the art. While rectangular cross-section is preferred, foamed plastic slats 12 can take any configuration well suited for the particular purpose for which structural element 10 is utilized.

The fiberglass rovings 14 which are woven with the foamed plastic slats 12 to produce structural element 10 are substantially untwisted fiberglass rovings. In this regard, fiberglass rovings 14 are not in the form of a woven fabric or mesh, but, rather, bundles of individual fiberglass rovings which are substantially untwisted. In accordance with the present invention, the fiberglass rovings should have as little twist as possible, for example, up to about two twists per inch, so as to provide maximum surface area and contact area between the fiberglass rovings 14 and foamed plastic slats 12. In this regard, one of the characteristics of the present invention which provides for a great strength to weight ratio and excellent bonding between fiberglass rovings 14 and foamed plastic slats 12 is that, through the use of the bundles of substantially untwisted fiberglass rovings, substantially the entire surface area of foamed plastic slats 12 is covered with fiberglass rovings 14. In the case of the use of foamed plastic slats 12 having a rectangular cross-section, by use of the bundles of substantially untwisted fiberglass rovings, at least 80 percent of the long faces of the foamed plastic slats 12 is covered by fiberglass rovings 14. This allows intimate contact of the two and allows the creation of a stronger bond between structural element 10 and face sheets 18 and 20 applied thereto.

Structural element 10 is manufactured in accordance with the present invention by weaving on a weaving machine parallel rows of bundles of substantially untwisted fiberglass rovings 14 and a series of parallel foamed plastic slats 12, so as to produce woven structure 10, wherein the series of parallel foamed plastic slats 12 extends transversely of the parallel rows of bundles of substantially untwisted fiberglass rovings 14 and alternately under and over adjacent bundles. Such weaving is carried out in accordance with the present invention while maintaining the looseness of the weave so that the structural element can take the form of a curved surface. As previously indicated, gaps or spaces 16 are maintained between adjacent foamed plastic slats 12 so that structural element 10 can take the form need for hand wrapping of individual plastic slats as carried out, for example, in connection with prior art materials. The weaving can be carried out on a conventional weaving machine, modified to the extent of allowing the weaving of bundles of fiberglass rovings and foamed plastic slats. One typical weaving machine effective to achieve such weaving is described, for example, in U.S. Pat. No. 3,100,004 to Felix et al.

In view of the fact that the weaving of the fiberglass rovings 14 and foamed plastic slats 12 is carried out on a weaving machine in accordance with the present invention, it is important that the fiberglass rovings 14 be impregnated with any resinous material prior to formation of the woven structural element 10. In lieu of the impregnation of the fiberglass rovings 14 with a resinous material, or the utilization of a woven fiberglass roving on a weaving machine, but would require hand operations. The ability to use a weaving machine in the production of structural elements in accordance with the present invention provides for economic and time savings.

Figure 3:
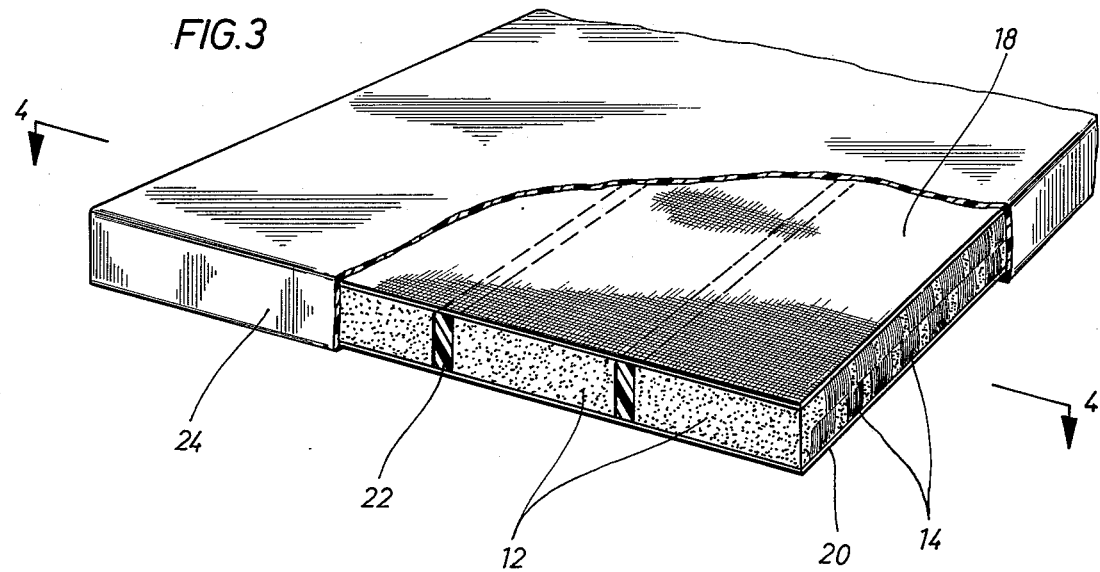
FIG. 3 is a perspective view, partially in cross-section, of the woven structural element of FIG. 2 after resin impregnation.
Figure 4:
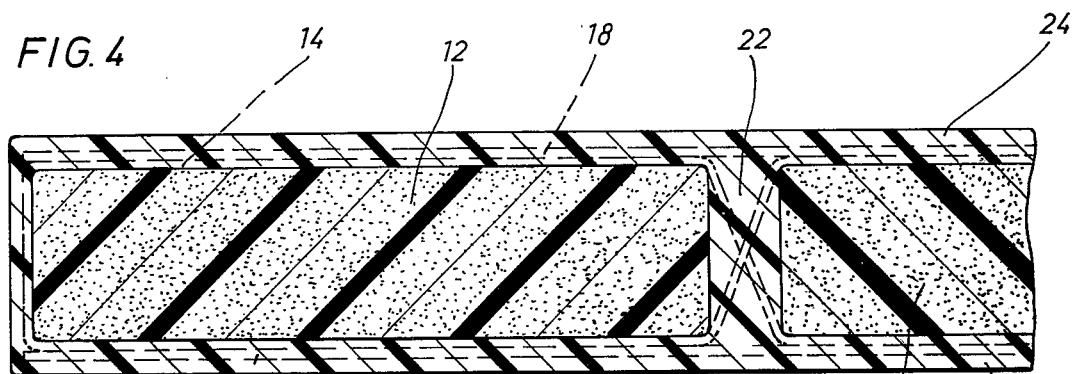
FIG. 4 is an enlarged cross-sectional view taken along line 4—4 of FIG. 3, illustrating X-reinforcement of I-beams in the resin impregnated woven structure.

The ability of the glass fiber rovings 14 and foamed plastic slats 12 to form woven structural elements and the woven structural element is impregnated with a resin so as to form upon setting of a rigid structural element as illustrated in FIGS. 3 and 4. The settable resin impregnate woven structural element is capable of hardening through internal reactions extremely effectively used in the formation of a boat hull and similar elements, wherein a great strength to weight ratio is required.

As illustrated in FIG. 4, the formation of the I-beams 22 of resin, coupled with the weaving of fiberglass rovings 14 and foamed plastic slats 12 so as to provide a gap 16 in which the I-beam of resin 22 is formed, provides for X-reinforcement of the I-beam 22 by fiberglass rovings. This X-reinforcement which is achieved by adherence to the parameters of the present invention provides for additional structural strength in the structural element of the present invention. This X-reinforcement is only achieved by maintaining the looseness of the weave of the fiberglass rovings and foamed plastic slats in the manner described above and impregnating the woven structural element with a settable resin so as to produce an I-beam structure. This presence of X-reinforcement of the resinous I-beam with fiberglass rovings provides for advantages in the structural element of the present invention not found in those previously proposed.

The method of the present invention is advantageously carried out to form a boat hull utilizing the structural elements of the present invention to provide strength and a minimum of weight. In forming any structural element from the woven structure 10 of the present invention, the woven structure is first formed into the desired form, e.g., the contoured curved surface of a boat hull, the woven structure is impregnated with a settable resin, and the settable resin is allowed to set so that the structural element maintains the desired form. When utilizing such material on a boat hull using a mold, the conventional fiberglass step which have been previously employed in connection with the production of fiberglass boat hulls.

Before the settable resin saturated or impregnated in outer face sheet or skin 26 is set, a central buoyancy element comprising the structural element 10 of the present invention is placed upon the outer facing sheet or skin 26 in a manner so that the central buoyancy element takes the form of the contoured curved surface of the mold and eventually the boat hull. Due to the looseness of the weave of the fiberglass rovings and foamed plastic slats, the structural element 10 of the present invention making up the central buoyancy element can readily be deformed so as to take the form of the curved surface, particularly the contoured curved surface of a boat hull.

After placement of the central buoyancy element 10 upon the outer face sheet or skin 26, the central buoyancy element 10 is impregnated with a settable resin. Preferably, this is the same resin as utilized in connection with impregnation of outer face sheet or skin 26. This provides for a very unitary structure.

The impregnation of central buoyancy element 10 with a settable resin provides for the formation of an I-beam structure, as illustrated in FIGS. 3 and 4. This, coupled with the looseness of the weave of fiberglass rovings and foamed plastic slats which allows the central buoyancy element to take the shape of the contoured curved surface provides for X-reinforcement of the resin I-beams with fiberglass rovings, thereby providing for increased structural strength in the fabricated boat hull.

After application of the resin to the central buoyancy element 10, and before setting of the resin, an inner face sheet or skin 28 is laid up upon the resin impregnated central buoyancy element 10 in the same manner as the outer face sheet or skin 26 is laid up upon the mold. This inner face sheet or skin 28 is of similar material as the outer face sheet or skin 26, and is made up of one or more plies of fiberglass matting or woven fiberglass cloth. This inner face sheet or skin 28 may be laid up upon central buoyancy element 10 while impregnated or saturated with a settable resin, or the settable resin can be used to impregnate or saturate the inner face sheet or skin 28 after laying up of the same. Either embodiment can be advantageously carried out in accordance with the present invention.

The settable resin that is used to impregnate or saturate the inner face sheet or skin 28 is again preferably the same resin employed to impregnate or saturate outer face sheet or skin 26 and central buoyancy element 10. Here again, this provides for the most advantageous unitary product.

After laying up the inner face sheet or skin 28, and after impregnation or saturation with a settable resin, the resin which impregnates the outer face sheet or skin 26, central buoyancy element 10 and inner face sheet or skin 28 is allowed to set. This provides for a very rigid structure, having a great strength to weight ratio.

Removal of the structure from the mold and surface finishing provides the final boat hull.

Figure 6:
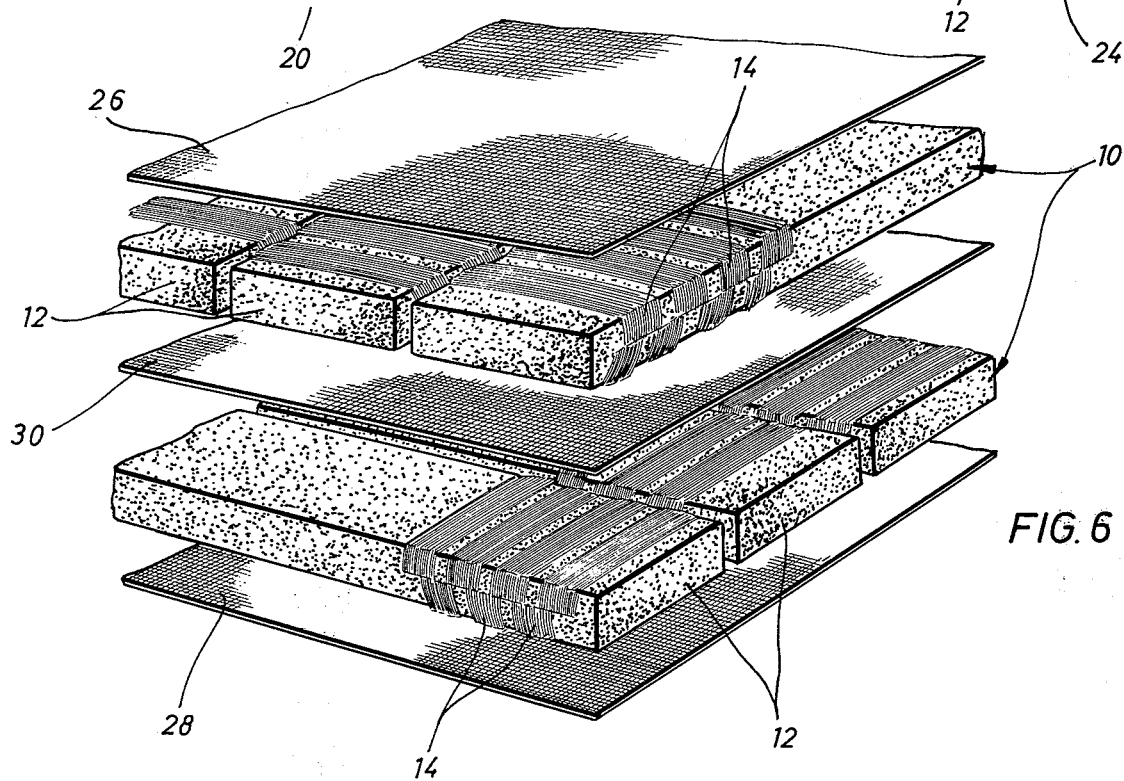
FIG. 6 is an exploded perspective view of an additional embodiment of the present invention illustrating the use of two woven structures angularly arranged.
Figure 5:
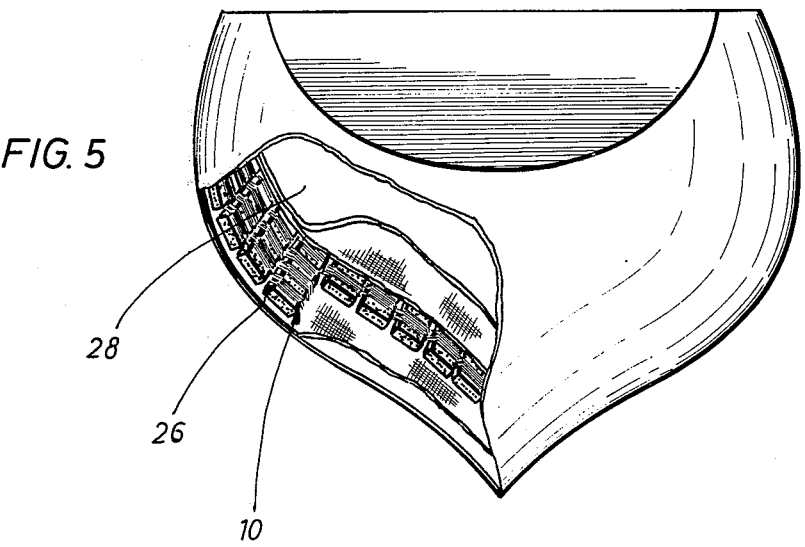
FIG. 5 is a perspective view of a boat hull shown in partial cross-section illustrating the adaption of the structural element of the present invention to a compound-curved structure.

The embodiment of FIG. 5 has been described in connection with the use of only a single central buoyancy element 10. This type of construction would most usually be employed in connection with the production of small fiberglass hull boats. Where a larger boat is being manufactured, it may often be advantageous to use two or more such central buoyancy elements. This embodiment is illustrated in FIG. 6, which illustrates the use of two central buoyancy elements 10 between an outer face sheet or skin 26 and inner face sheet or skin 28. In the embodiment illustrated, an additional sheet 30 of woven glass fiber cloth or glass fiber matting is introduced between the central buoyancy elements 10 as a spacing sheet, this sheet also being impregnated with a settable resin so as to produce a unitary product.

In the embodiment illustrted in FIG. 6, the foamed plastic slats 12 of one central buoyancy element 10 are angularly arranged with respect to the foamed plastic slats 12 of the second central buoyancy element 10. Preferably, this angular arrangement is such that the foamed plastic slats of one central buoyancy element 10 extend perpendicular to the lengthwise direction of the foamed plastic slats 12 of the other central buoyancy element 10. This provides for maximum reinforcement of the structural element and the greatest possible strength and rigidity through internal ribbing.

The dimensions of the various elements of the structural element of the present invention are in no way critical to the method and structural element described. However, to best understand the relative sizes of the various elements, in a preferred embodiment of the present invention, the thickness of the foamed plastic slats will range from approximately one-quarter inch to 1 inch. The smaller thicknesses will be most applicable to the fabrication of boat hulls for small boats, while foam thicknesses near the upper range of about 1 inch will be most applicable for the production of larger boat hulls. In addition, as previously indicated, the foamed plastic slats are preferably of rectangular cross-section with the long face generally ranging from about 1 to 3 inches. In a typical example, 7 1½ inch foamed plastic slats are utilized to make 1 foot of woven structure, thereby providing a gap of approximately one-quarter inch between slats.

To establish the strength characteristics and stiffness characteristics of the structural element of the present invention, a comparative test was made using test strips 3 inches × 16 inches. One sample was laid up using fiberglass and resin (polyester resin) only, with a second being laid up with fiberglass, the same resin and the structural element of the present invention, approximately the same amount of fiberglass and resin being used in each sample.

The test results for strength and stiffness can be summarized as follows:

|  | One layer of 10 oz. woven roving, 2 layers of 1½ oz. mat and 1 layer of 6 oz. cloth | Structural element of present invention with one layer of 6 oz. cloth each side. |
| --- | --- | --- |
| FRACTURE | 60,000 lbs. | 120,000 lbs. |
| DEFLECTION 1% | 65 grams | 1904 grams |
| DEFLECTION 2% | 123 grams | 4071 grams |
| SPECIFIC GRAVITY | 1.31 | .507 |

These test results show that the sample produced with the structural element of the present invention has substantially improved strength and stiffness when compared to a fiberglass-resin laminate not containing the woven structure of fiberglass roving and foamed plastic slats.

While the above description relates to the preferred use of the structural element of the present invention in the fabrication of a boat hull, the structural element has a wide variety of uses, such as in aircraft parts, automobile and trailer bodies, building parts, etc. In short, it can be used wherever great rigidity and a high strength to weight ratio are required.

Several preferred modes and embodiments of the present invention have been illustrated and described in connection with the particular field of fabricating a fiberglass boat hull, and, more generically, to the production of a structural element having a high strength to weight ratio. It should be understood, however, that many other changes and modifications may be made without departing from the spirit and scope of the present invention with the details and variations indicated above merely being representative of the many details and variations possible in structure, method and field of application of the present invention.

What is claimed is:

1. A structural element comprising parallel rows of alternately oppositely undulated bundles of substantially untwisted fiberglass rovings and a series of parallel foamed plastic slats extending transversely of said rows and alternately under and over adjacent bundles to define a woven structural element of foamed plastic slats and bundles of fiberglass rovings, the weave of said woven structural element allowing said element to take the form of a curved surface.

2. The structural element of claim 1, wherein said slats are rectangular in cross-section and said bundles of fiberglass rovings cover substantially the entire surface area of the two long surfaces of each of said foamed plastic slats.

3. The structural element of claim 1, wherein said woven structure is impregnated with a settable resin.

4. The structural element of claim 3, wherein the resin impregnated woven structure includes I-beams of a settable resin between foamed plastic slats.

5. The structural element of claim 4, wherein the weave of said bundles of fiberglass rovings and foamed plastic slats provides X-reinforcement of glass rovings in said I-beams of settable resin.

6. The structural element of claim 1, wherein a space of at least one-sixteenth inch is present between foamed plastic slats.

7. The structural element of claim 6, wherein the space between slats is at least one-eighth inch.

8. A structural element for boat hulls comprising:
   a. a first face sheet of resin impregnated woven glass cloth or glass matting;
   b. a central buoyancy element comprising a resin impregnated woven element comprising parallel rows of alternately oppositely undulated bundles of substantially untwisted fiberglass rovings and a series of parallel foamed plastic slats extending transversely of said rows and alternately under and over adjacent bundles to define a woven element, the weave of said woven element allowing said element to take the form of the curved surfaces of a boat hull; and
   c. a second face sheet of resin impregnated woven glass cloth or glass matting, said layers (a), (b) and (c) being integrally united by cured resin;
   said first and second face sheets being on opposite sides of said central buoyancy element.

9. The structural element of claim 1, wherein said first and second face sheets comprise a plurality of layers of resin impregnated woven glass cloth or glass matting.

10. The structural element of claim 9, wherein said first and second face sheets are bonded to said central buoyancy element by a settable resin in the set state.

11. The structural element of claim 9, wherein in said central buoyancy element said slats are rectangular in cross-section and said bundles of fiberglass rovings cover substantially the entire surface area of the two long surfaces of each of said foamed plastic slats.

12. The structural element of claim 9, wherein said central buoyancy element includes I-beams of resin between foamed plastic slats.

13. The structural element of claim 10, wherein in said central buoyancy element, the weave of said structural element forms a space of at least one-sixteenth inch between foamed plastic slats.

14. The structural element of claim 13, wherein the space between slats is at least one-eighth inch.

15. A method of manufacturing a structural element comprising the steps of:
   a. weaving on a weaving machine parallel rows of bundles of substantially untwisted fiberglass rovings and a series of parallel foamed plastic slats to produce a woven structure wherein said series of parallel fomed plastic slats extends transversely of said rows and alternately under and over adjacent bundles; and
   b. maintaining the looseness of the weave so that the structural element can take the form of a curved surface.

16. The method of claim 15, further including the steps of:
   c. forming the woven structure into a desired form;
   d. impregnating said woven structure with a settable resin; and
   e. setting the settable resin so that the structural element maintains the desired form.

17. The method of claim 16, wherein in step (c) the woven structure is formed into the shape of a boat hull.

18. The method of claim 15, wherein in said central buoyancy element a distance of at least one-sixteenth inch is maintained between foamed plastic slats.

19. The method of claim 18, wherein a distance of at least one-eighth inch is maintained between foamed plastic slats.

20. The method of claim 16, wherein the resin impregnation of said woven structure and setting of said resin forms I-beams of resin between foamed plastic slats, said I-beams being provided with X-reinforcement by glass rovings.

21. A method of forming a boat hull using a mold, comprising the steps of:
   a. laying upon said mold a first face sheet of settable resin impregnated fiberglass matting or woven fiberglass cloth;
   b. placing on said first face sheet a central buoyancy element comprising a woven element comprising parallel rows of alternateley oppositely undulated bundles of substantially untwisted fiberglass rovings and a series of parallel foamed plastic slats extending under and over adjacent bundles to define a woven element, the weave of said woven element allowing said element to take the form of the curved surfaces of a boat hull;

c. impregnating said central buoyancy element with a settable resin;

d. laying upon said central buoyancy element a second face sheet of settable resin impregnated fiberglass matting or woven fiberglass cloth; and e. setting said settable resins.

22. The method of claim 21, wherein prior to step (a) gel coat and release agent are coated on said mold.

23. The method of claim 22, wherein in said central buoyance element a distance of at least one-sixteenth inch is maintained between foamed plastic slats.

24. The method of claim 23, wherein a distance of at least one-eighth inch is maintained between foamed plastic slats.

25. The method of claim 21, wherein the resin impregnation of said woven structure and setting of said resin forms I-beams of resin between foamed plastic slats, said I-beams being provided with X-reinforcement by glass rovings.

* * * * *

UNITED STATES PATENT OFFICE
CERTIFICATE OF CORRECTION

PATENT NO. : 3,920,871
DATED : November 18, 1975
INVENTOR(S) : Frederick M. Johnson, et al It is certified that error appears in the above-identified patent and that said Letters Patent are hereby corrected as shown below:

Under References Cited, UNITED STATES PATENTS, Anderson, Patent No. 3,573,144; "Anderson" should read --Andersen--.

Column 1, line 28, "derson" should read --dersen--.

Column 1, line 57, after "utility" insert --of the--; delete "the laminated".

Column 9, line 16, "After placement" should read --Before and after--.

Column 10, line 19, "illustrted" should read --illustrated--;

Column 14, line 3, "bouyance" should read --bouyancy--.

Signed and Sealed this eighteenth Day of May 1976

[SEAL]

Attest:

RUTH C. MASON
Attesting Officer

C. MARSHALL DANN
Commissioner of Patents and Trademarks